(12) United States Patent
Gilling et al.

(10) Patent No.: US 11,549,525 B2
(45) Date of Patent: Jan. 10, 2023

(54) ELECTRONICALLY ADJUSTABLE PRESSURE COMPENSATED FLOW CONTROL WITH PRESSURE LIMITING RELIEF VALVE

(71) Applicant: HUSCO International, Inc., Waukesha, WI (US)

(72) Inventors: Michael Gilling, Pewaukee, WI (US); Eric P. Hamkins, Waukesha, WI (US); Kyle Ballweg, Eagle, WI (US); Jace Birschbach, Milwaukee, WI (US)

(73) Assignee: HUSCO International, Inc., Waukesha, WI (US)

( * ) Notice: Subject to any disclaimer, the term of this patent is extended or adjusted under 35 U.S.C. 154(b) by 19 days.

(21) Appl. No.: 17/157,784

(22) Filed: Jan. 25, 2021

(65) Prior Publication Data

US 2021/0231135 A1 Jul. 29, 2021

Related U.S. Application Data

(60) Provisional application No. 62/965,714, filed on Jan. 24, 2020.

(51) Int. Cl.
*F16K 31/124* (2006.01)
*F15B 13/04* (2006.01)
(Continued)

(52) U.S. Cl.
CPC ...... *F15B 13/0405* (2013.01); *F15B 13/0433* (2013.01); *F15B 11/163* (2013.01); *F15B 13/024* (2013.01); *F15B 13/026* (2013.01); *F15B 13/0417* (2013.01); *F15B 2211/40569* (2013.01); *F15B 2211/50518* (2013.01); *F15B 2211/50554* (2013.01); *F15B 2211/50572* (2013.01); *F15B 2211/526* (2013.01); *F15B 2211/55* (2013.01); *F15B 2211/6051* (2013.01);
(Continued)

(58) Field of Classification Search
CPC ............. F15B 13/0405; F15B 13/0433; F15B 13/026; F15B 13/024; F15B 13/0417; F15B 11/163; F15B 2211/50554; F15B 2211/40569; F15B 2211/50518; F15B 2211/50572; F15B 2211/526; F15B 2211/55; F15B 2211/6051; F15B 2211/6055; F15B 2211/6658; F16K 31/406
USPC ......... 251/30.03; 137/492.5, 505.11, 505.13, 137/505.46, 599.09, 115.01, 115.18, 491
See application file for complete search history.

(56) References Cited

U.S. PATENT DOCUMENTS

| 2,851,564 | A | * | 9/1958 | Zimmerman | .......... F16K 17/105 137/505.11 |
| 3,174,410 | A | * | 3/1965 | Booth | .................. F16K 17/105 60/329 |

(Continued)

*Primary Examiner* — Minh Q Le
(74) *Attorney, Agent, or Firm* — Quarles & Brady LLP (57) ABSTRACT

A load sense pressure regulating system is provided. The load sense pressure regulating system can be operable between a flow regulation mode and a pressure limiting mode. When the load sense pressure control system is in the flow regulation mode, flow between a load sense inlet and a pilot vent are metered by a main poppet. The load sense pressure regulating system can also include a control valve downstream from the pilot vent that is configured to control a relief setting of a relief valve to regulate the load sense pressure within a desired operating range.

20 Claims, 3 Drawing Sheets

(51) Int. Cl.
*F15B 13/043* (2006.01)
*F16K 31/40* (2006.01)
*F15B 13/02* (2006.01)
*F15B 11/16* (2006.01)

(52) U.S. Cl.
CPC ................ *F15B 2211/6055* (2013.01); *F15B 2211/6658* (2013.01); *F16K 31/406* (2013.01)

(56) References Cited

U.S. PATENT DOCUMENTS

| | | | | |
|---|---|---|---|---|
| 3,180,355 A * | 4/1965 | Long | ................ | G05D 16/2097 251/26 |
| 3,515,165 A * | 6/1970 | Zadoo | ................ | G05D 16/2097 137/220 |
| 3,578,019 A * | 5/1971 | Turolla | ............... | F16K 17/0433 251/360 |
| 3,593,741 A * | 7/1971 | Odenthal | .............. | F16K 17/105 251/26 |
| 3,677,287 A * | 7/1972 | Morris | ................... | F16K 17/04 137/491 |
| 3,752,174 A * | 8/1973 | Turolla | ................. | F16K 17/105 137/244 |
| 4,062,374 A * | 12/1977 | Marshall | ................. | F15B 11/05 137/596.13 |
| 4,135,541 A * | 1/1979 | Lorimor | ................ | F16K 31/363 137/491 |
| 4,336,903 A * | 6/1982 | Zirps | ..................... | F15B 21/042 236/92 R |
| 4,896,694 A * | 1/1990 | Rausch | ................. | F16K 17/105 251/120 |
| 6,986,362 B2 * | 1/2006 | Cheong | ................ | F15B 13/024 251/282 |
| 7,467,642 B2 * | 12/2008 | Prinsen | .............. | F16K 17/0433 137/492.5 |
| 8,365,763 B2 * | 2/2013 | Woelfges | ............. | G05D 16/166 138/40 |
| 10,564,652 B2 | 2/2020 | Mueller et al. | | |
| 2007/0056632 A1 * | 3/2007 | Cheong | ................ | F16K 17/105 137/491 |

\* cited by examiner

ELECTRONICALLY ADJUSTABLE PRESSURE COMPENSATED FLOW CONTROL WITH PRESSURE LIMITING RELIEF VALVE

CROSS-REFERENCES TO RELATED APPLICATIONS

The present application is based on, claims priority to, and incorporates herein by reference in its entirety U.S. Provisional Patent Application No. 62/965,714, filed on Jan. 24, 2020, and entitled "Electronically Adjustable Pressure Compensated Flow Control with Pressure Limiting Relief Valve."

STATEMENT REGARDING FEDERALLY SPONSORED RESEARCH

Not Applicable.

BACKGROUND

Pressure compensated load sensing (PCLS) systems often use a load sense pressure relief valve to limit system pressure. By limiting load sense pressure, the system pressure is limited while allowing functions operating at lower pressures to continue operating.

BRIEF SUMMARY

The present disclosure provides a hydraulic system including a pressure compensated flow control system with electronic pressure limiting capability.

According to one aspect of the present disclosure, a load sense pressure control system is provided. The system includes a first control valve including a load sense inlet port, a tank outlet port, and a pilot vent. The first control valve includes a main poppet moveable between a first position and a second position, where a poppet spring biases the main poppet toward the first position, and a relief poppet moveable between an open position and a closed position, where a relief spring biases the relief poppet toward the closed position. A control chamber is arranged between the main poppet and the relief poppet, where the control chamber is in fluid communication with the pilot vent when the relief poppet is in the open position, and where the control chamber is in fluid communication with the pilot vent when the main poppet is in the first position. A control orifice is arranged between the load sense inlet and the control chamber. The system further includes a second control valve downstream from and in fluid communication with the pilot vent. The second control valve is configured to adjust the pressure in the pilot vent from zero to a difference between a maximum load sense pressure relief setting and a minimum load sense relief setting pressure.

According to another aspect of the present disclosure, a load sense relief system is provided. The system includes a load sense relief valve including a relief poppet moveable between a closed position and an open position, a control chamber on a first side of the relief poppet, and a relief chamber on a second side of the relief poppet opposite the first side. A relief spring acts on the second side of the relief poppet. The relief spring defines a mechanical relief setting. The load sense relief valve further includes a main poppet arranged between a load sense inlet port and the control chamber. A poppet spring is arranged within the control chamber and configured to apply a spring load acting on a spring side of the main poppet. The load sense relief valve further includes a control orifice configured to provide fluid communication between the load sense inlet port and the control chamber. A control valve downstream from and in fluid communication with the relief chamber is configured to apply a predetermined pressure acting on the second side of the relief poppet to increase a relief pressure setting of the load sense relief valve above the mechanical relief setting.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Before any aspect of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown, but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

The use of the terms "downstream" and "upstream" herein are terms that indicate direction relative to the flow of a fluid. The term "downstream" corresponds to the direction of fluid flow, while the term "upstream" refers to the direction opposite or against the direction of fluid flow.

In hydraulic circuits, electronically adjustable pressure limits are desired. An electrohydraulic ("EH") load sense relief valve ("LSRV") allows a controller to change the system pressure limit electronically. Often, the pressure limit is very high (e.g., about 250 bar to 350 bar, or greater). Likewise, the electrohydraulic load sense relief valve needs to be designed to withstand those high pressures. In addition, the electronic solenoid actuator portion of the electrohydraulic load sense relief valve must develop a force high enough to balance the high pressure acting on the relief valve. These high pressure constraints can add significant costs to the design of the electrohydraulic load sense relief valve.

Figure 1:
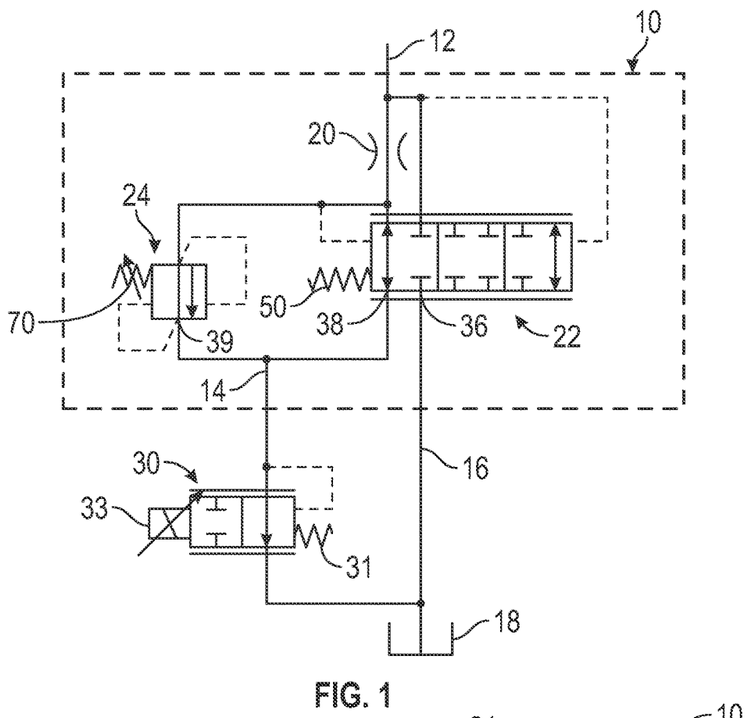
FIG. 1 illustrates a hydraulic schematic of a load sense regulation system according to one aspect of the present disclosure.

FIG. 1 illustrates a hydraulic circuit including a load sense regulation valve 10 (sometimes known as a pressure compensated flow control valve, a load sense relief valve, or a drain regulator) with electronic pressure limiting functionality. The load sense regulation valve 10 can include a load sense inlet port 12, a pilot vent 14, and a tank return 16. The tank return 16 is in fluid communication with a tank 18. The load sense regulation valve 10 can include a control orifice 20 downstream from the load sense inlet port 12. In the illustrated non-limiting example, the control orifice 20 can be a fixed or constant orifice (e.g., a 1.0 mm orifice). In other non-limiting examples, the control orifice 20 can be a variable orifice.

The load sense regulation valve 10 can also include a flow regulation control valve 22 downstream from the load sense inlet port 12. The flow regulation control valve 22 is configured to meter fluid flow between both the load sense inlet port 12 and the pilot vent 14, and fluid flow between the load sense inlet port 12 and the tank return 16. In the illustrated non-limiting example, the flow regulation control valve 22 is moveable between a first position (shown), a second position, and a neutral position between the first and second position. With the flow regulation control valve 22 in the first position, fluid flows from the load sense inlet port 12, through the control orifice 20, and out to the pilot vent 14. With the flow regulation control valve 22 in the second position, fluid flows from the load sense inlet port 12 and out to tank 18 through the tank return 16. With the flow regulation control valve 22 in the neutral position, fluid flow through the flow regulation control valve 22 is inhibited or blocked.

In the illustrated non-limiting example, the load sense regulation valve 10 can include a pilot relief valve 24. The pilot relief valve 24 can be arranged downstream of the control orifice 20. In the illustrated non-limiting example, the vent flow from the pilot relief valve 24 is in fluid communication with the pilot vent 14. The pilot relief valve 24 can be an adjustable pressure relief valve (shown) or a fixed pressure relief valve. In the illustrated non-limiting example, the pilot relief valve 24 is a manually adjustable pressure relief valve. The pilot relief valve 24 can be configured to relieve pressure upstream of the pilot relief valve 24 at a predetermined pressure above the pressure downstream of the pilot relief valve 24.

Referring still to FIG. 1, the hydraulic circuit can include a control valve downstream of the load sense regulation valve 10. The downstream control valve can be configured to restrict flow through the pilot vent 14. In the illustrated non-limiting example, the downstream control valve is an electrohydraulic pressure regulating valve 30 ("EPRV") and is arranged downstream of the pilot vent 14 of the load sense regulation valve 10. In other non-limiting examples, the downstream control valve can be a mechanical pressure regulating valve (FIG. 4), an electrohydraulic pressure relief valve, a mechanical pressure relief valve, an electrohydraulic pressure reducing and relieving valve (FIG. 5), or a mechanical pressure reducing and relieving valve (FIG. 6).

The electrohydraulic pressure regulating valve 30 can be movable between an open position (shown), where fluid flow from the electrohydraulic pressure regulating valve 30 vents to tank 18, and a closed position, where fluid flow is inhibited or blocked through the electrohydraulic pressure regulating valve 30. The electrohydraulic pressure regulating valve 30 can be configured to regulate a pressure upstream of the electrohydraulic pressure regulating valve 30 over a predetermined pressure range (e.g., 0 to 100 bar). In the illustrated non-limiting example, the electrohydraulic pressure regulating valve 30 includes an EPRV spring 31 configured to bias the electrohydraulic pressure regulating valve 30 toward the open position. The electrohydraulic pressure regulating valve 30 can also include a solenoid 33 that is configured to selectively apply a force on one side of the electrohydraulic pressure regulating valve 30. In the illustrated non-limiting example, the solenoid 33 may be a proportional solenoid that is configured to selectively provide a range of forces on one side of the electrohydraulic pressure regulating valve 30. The EPRV spring 31 and the pressure upstream of the electrohydraulic pressure regulating valve 30 are configured to apply a force on an opposing side of the electrohydraulic pressure regulating valve 30 to oppose the force of the solenoid 33. The force balance between the force provided by the solenoid 33 and the combined force provided by the upstream pressure and the EPRV spring 31 may determine a position of the electrohydraulic pressure regulating valve 30 between the open position, the closed position, and any position between the open position and the closed position. In other words, the force provided by the solenoid 33 may selectively vary a restriction through the electrohydraulic pressure regulating valve 30. Because a force provided by the EPRV spring 31 may be constant, the force provided by the pressure upstream of the electrohydraulic pressure regulating valve 30 may be varied to balance the force provided by the solenoid 33. For example, the electrohydraulic pressure regulating valve 30 may vary a restriction therethrough until the upstream pressure, and the constant force from the EPRV spring 31, balances the force provided by the solenoid 33, which, in turn, may selectively control the pressure upstream of the electrohydraulic pressure regulating valve 30 to any value within the predetermined pressure range. In some non-limiting examples, the solenoid 33 may be in communication with a controller that is configured to selectively control an output force provided by the solenoid 33. In the illustrated non-limiting example, the electrohydraulic pressure regulating valve 30 is a two-position, two-way valve. In other non-limiting examples, the electrohydraulic pressure regulating valve can be a two-position, three-way valve.

Figure 2:
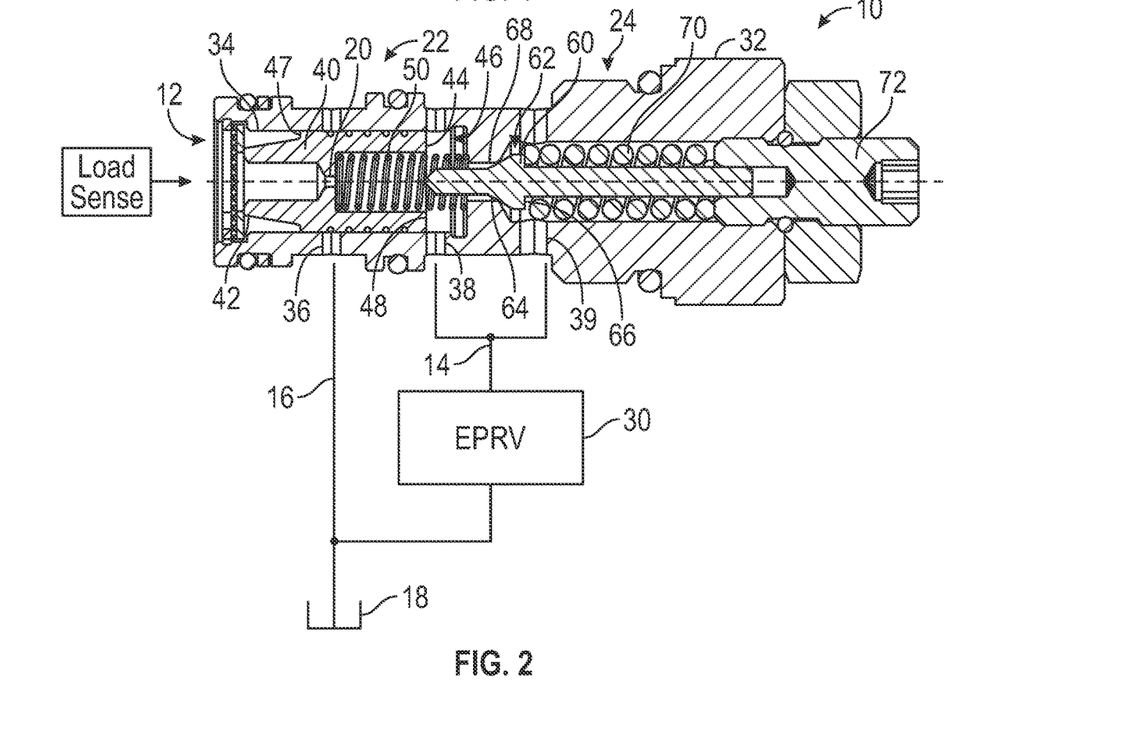
FIG. 2 illustrates a cross-sectional view of a load sense regulation valve with a downstream control valve according to one aspect of the present disclosure.

Referring now to FIG. 2, a cross-section of the load sense regulation valve 10 of FIG. 1 is illustrated. The load sense relief valve can include a valve body 32. In the illustrated non-limiting example, the flow regulation control valve 22 and the pilot relief valve 24 can be arranged within the valve body 32. The flow regulation control valve portion of the valve body 32 can include a valve bore 34 with an opening at a distal end thereof, the opening defining the load sense inlet port 12. The valve body can also include a tank outlet port 36 in fluid communication with the tank return 16, a first control port 38 in fluid communication with the pilot vent 14, and a second control port 39 in fluid communication with the pilot vent 14.

The flow regulation control valve 22 can include a main poppet 40 slidably received within the valve bore 34. The main poppet 40 can include a first side 42 (e.g., a load sense side) and a second side 44 (e.g., a spring side) opposite the first side 42. The first side 42 can receive pressure acting thereon from the load sense inlet port 12. The flow regulation control valve 22 can include a first metering edge 47 configured to meter flow between the load sense inlet port 12 and the tank outlet port 36 and a second metering edge 48 configured to meter flow between the load sense inlet port 12 and the first control port 38. In the illustrated non-limiting example, the first and second metering edges 47, 48 can be provided on the main poppet 40. In the specific non-limiting example illustrated in FIG. 2, the first metering edge 47 can be arranged on the first side 42 of the main poppet 40 and the second metering edge 48 can be arranged on the second side 44 of the main poppet 40. As the main poppet 40 moves from the first position (shown) toward the second position, a metering or flow area between the first control port 38 and the second metering edge 48 decreases and a metering area between the tank outlet port 36 and the first metering edge 47 increases. Conversely, as the main poppet 40 moves from the second position toward the first position, the metering area between the first control port 38 and the second metering edge 48 increases and the metering area between the tank outlet port 36 and the first metering edge 47 decreases.

The load sense regulation valve 10 can include a control chamber 46 arranged between the flow regulation control valve 22 and the pilot relief valve 24. The control orifice 20 can provide fluid communication between the load sense inlet port 12 and the control chamber 46. The control chamber can also be in fluid communication with the electrohydraulic pressure regulating valve 30 via the first control port 38 and the pilot vent 14. In the illustrated non-limiting example, the control orifice 20 can be provided in the main poppet 40 (e.g., bored through the first side 42 to the second side 44).

The flow regulation control valve 22 can include a main poppet spring 50. In the illustrated non-limiting example, the main poppet spring 50 can be arranged between the second side 44 of the main poppet 40 and an end of the valve bore 34. The main poppet spring 50 can be configured to bias the main poppet 40 toward the first position (shown). In the illustrated non-limiting example, the main poppet spring 50 is arranged within the control chamber 46.

Referring still to FIG. 2, the pilot relief valve 24 can include a relief poppet 60 slidably arranged in a relief chamber 62. The relief poppet 60 can include a first side 64 and a second side 66. The first side 64 can receive pressure acting thereon from the control chamber 46 via a relief passage 68. The pilot relief valve 24 can include a relief spring 70. The relief spring 70 can be arranged between the second side 66 of the relief poppet 60 and a stop 72. The stop 72 can be configured as a relief adjustment mechanism (e.g., a threaded adjustment mechanism) configured to adjust the preload on the relief spring 70 to adjust the mechanical cracking pressure of the pilot relief valve 24. In the illustrated non-limiting example, the relief spring 70 is arranged within the relief chamber 62. The relief spring 70 can be configured to bias the relief poppet 60 toward the closed position (shown).

As previously described herein, the electrohydraulic pressure regulating valve 30 can be configured to regulate a pressure upstream of the electrohydraulic pressure regulating valve 30. In the illustrated non-limiting example, the electrohydraulic pressure regulating valve 30 can adjust the pressure of the pilot vent 14, and the ports in fluid communication therewith (e.g., the second control port 39). As such, the electrohydraulic pressure regulating valve 30 can control or adjust the pressure within the relief chamber 62.

As will be described in greater detail below, by routing pressure compensated flow from the flow regulation control valve 22 through the electrohydraulic pressure regulating valve 30, the pressure in the pilot vent 14 (and thereby, the relief chamber 62) can increase the effective cracking pressure of the pilot relief valve 24. This can allow for a low pressure, low flow electrohydraulic pressure reducing valve to be used to achieve an electronically adjustable offset to a mechanical setting in a pilot relief valve.

Referring now to FIGS. 1 and 2, the load sense regulating valve 10 can operate in two distinct modes: a Flow Regulation Mode and a Pressure Limiting Mode.

Flow Regulation Mode

As detailed below, the flow regulation control valve 22 can be configured to regulate flow when the pilot relief valve 24 is in either an open position or a closed position. With the relief poppet 60 in the closed position, the main poppet 40 is configured to move about the first position to maintain a balance of forces between a load sense pressure from the load sense inlet port 12 acting on the first side 42 of the main poppet 40, and a pressure within the control chamber 46, in addition to a spring load from the main poppet spring 50, acting on a second side 44 of the main poppet 40.

In the illustrated non-limiting example, the flow through the electrohydraulic pressure regulating valve 30 can be limited to the regulated flow from the flow regulation control valve 22. Flow from system load sense through the load sense inlet port 12 flows across the control orifice 20 into the control chamber 46. The position of the main poppet 40 changes to maintain a substantially constant pressure differential across the first side 42 and the second side 44 of the main poppet 40. Maintaining the substantially constant pressure differential across the main poppet 40 also provides a substantially constant flow through the control orifice 20 on the main poppet 40. The substantially constant pressure differential can be maintained by metering the flow through the first control port 38 via the second metering edge 48 varying the flow area through the first control port 38. As the pressure acting on the first side 42 of the main poppet 40 changes (e.g., from changes in load sense pressure), the main poppet 40 can move to restrict flow from the control chamber 46 to the pilot vent 14 until the pressure in the control chamber 46 plus the spring force from the main poppet spring 50 acting on the main poppet 40 acting on the second side 44 is balanced by the system load sense pressure acting on the first side 42 of the main poppet 40. In that way, the position of the main poppet 40 is based on the load sense pressure, the pressure within the control chamber 46, and the force from the main poppet spring 50 acting on the main poppet 40. Thus, the main poppet spring 50 can define the magnitude of the pressure differential across the main poppet 40.

Pressure Limiting Mode

In pressure limiting or relief mode, the pilot relief valve 24 can relieve excess pressure to the pilot vent 14, when the pressure in the control chamber 46 exceeds the desired load sense pressure relief setting. When the load sense regulation valve 10 is in the pressure limiting mode, the relief poppet 60 moves toward the open position when the pressure in the control chamber 46 acting on the first side 64 of the relief poppet 60 is greater than the combined force of the relief spring 70 plus the pressure within the relief chamber 62 acting on the second side 66 of the relief poppet 60. When the relief poppet 60 moves toward the open position, the main poppet 40 is configured to move toward the second position to vent the load sense inlet port 12 to the tank outlet port 36. With the load sense regulating valve 10 in the pressure limiting mode, the main poppet 40 is configured to move about the second position to maintain a balance of forces between a load sense pressure from the load sense inlet port 12 acting on the first side 42 of the main poppet 40, and a pressure within the control chamber 46, in addition to a spring load from the main poppet spring 50, acting on a second side 44 of the main poppet 40.

In the pressure limiting mode, the control orifice 20 and the main poppet spring 50 are configured to limit the flow through the pilot relief valve 24. In the pressure limiting mode, the magnitude of the flow through the pilot relief valve 24 can be the same as the magnitude of flow regulated by the flow regulation control valve 22 when the load sense regulation valve is in the flow regulation mode. Thus, the magnitude of flow through the electrohydraulic pressure regulating valve 30 can be substantially less than the total pressure relief flow from the load sense inlet port 12 through the tank outlet port 36.

The relief chamber 62 of the pilot relief valve 24 is connected to the pilot vent 14 via the second control port 39. The effective cracking pressure of the pilot relief valve 24 can thus be increased by the pressure in the pilot vent 14. For example, the pilot relief valve 24 can define a mechanical pressure relief setting determined by the relief spring 70 and the spring preload. In addition, the electrohydraulic pressure regulating valve 30 can control the pressure within the pilot vent 14, and thereby the relief chamber 62 of the pilot relief valve 24, between zero and the difference between a maximum load sense pressure relief setting and a minimum load sense pressure relief setting. For example, the electrohydraulic pressure regulating valve 30 can control a pressure acting on the second side 66 of the relief poppet 60 by regulating the pressure within the relief chamber 62 (via the pilot vent 14), thereby adjusting the effective cracking pressure of the pilot relief valve 24.

When the pressure in the control chamber 46 exceeds the mechanical pressure relief setting plus the pilot vent 14 pressure determined by the EPRV 30, the pilot relief valve 24 opens and allows flow from the control chamber 46 to the pilot vent 14 via the relief passage 68. In response to the pilot relief valve 24 moving from the closed position to the open position, the main poppet 40 moves to close the restriction from the control chamber 46 to the pilot vent 14 (e.g., by closing the first control port 38), thereby moving the main poppet 40 from the first position (shown) toward the second position to open the tank outlet port 36. According to one specific and non-limiting example, a desired load sense pressure relief setting (e.g., between 250 and 350 bar) can therefore be the sum of the mechanical pilot relief valve setting (e.g., 250 bar) plus the electrohydraulic pressure regulating valve 30 pressure setting (e.g., between 0 and 100 bar).

The electrohydraulic pressure regulating valve 30 can vary the effective cracking pressure of the pilot relief valve 24. For example, when the electrohydraulic pressure regulating valve 30 is commanded to provide a minimum pilot vent pressure (e.g., when the EPRV 30 is in the open position and the solenoid 33 provides a minimum force), the effective cracking pressure of the pilot relief valve 24 can be equal to the mechanical relief setting. As such, a minimum load sense pressure relief setting can be defined by the relief spring 70 of the pilot relief valve 24. When the electrohydraulic pressure regulating valve 30 is commanded to provide a maximum pilot vent pressure (e.g., a maximum pressure that corresponds with a maximum force of the solenoid 33), the effective cracking pressure of the pilot relief valve 24 can be equal to the mechanical relief setting plus the pressure regulating range of the electrohydraulic pressure regulating valve 30 (e.g., for a 0-100 bar EPRV, the range would be 100 bar). As such, a maximum load sense pressure relief setting can be defined by the mechanical relief setting of the pilot relief valve 24 plus the range of the electrohydraulic pressure regulating valve 30. The selective variation of the force from the solenoid 33 on the electrohydraulic pressure regulating valve 30 corresponds with a selective variation of a pressure in the pilot vent 14, and thereby a selective variation of the pressure in the relief chamber 62. The effective relief pressure of the pilot relief valve 24 is then selectively varied between the mechanical relief setting and the maximum load sense pressure relief setting by varying the pressure within the relief chamber 62. That is, the electrohydraulic pressure regulating valve 30 is configured to apply a predetermined pressure that acts on the second side 66 of the pilot relief valve 24 to increase a relief pressure setting (e.g., a cracking pressure) of the load sense regulation valve 10 above the mechanical relief setting. Thus, the electrohydraulic pressure regulating valve 30 can vary the effective cracking pressure of the pilot relief valve 24 to any desired pressure relief setting between a maximum load sense pressure relief setting and a minimum load sense pressure relief setting.

The system can provide multiple distinct advantages. A low pressure, low flow EPRV can be used to control a much higher load sense pressure limit, and the flow through the EPRV is small, which means the system load sense pressure will not be sensitive to how many functions are feeding the load sense passage. In addition, the load sense regulation valve pressure relief mode set point can be increased by the pressure in the pilot vent by controlling the EPRV setting. In that way, a low pressure EPRV can be used to control the relief valve set point. For example, as described above, the EPRV only needs to be able to regulate pressure from zero to the difference between the maximum and minimum desired load sense pressure control range.

Figure 3:
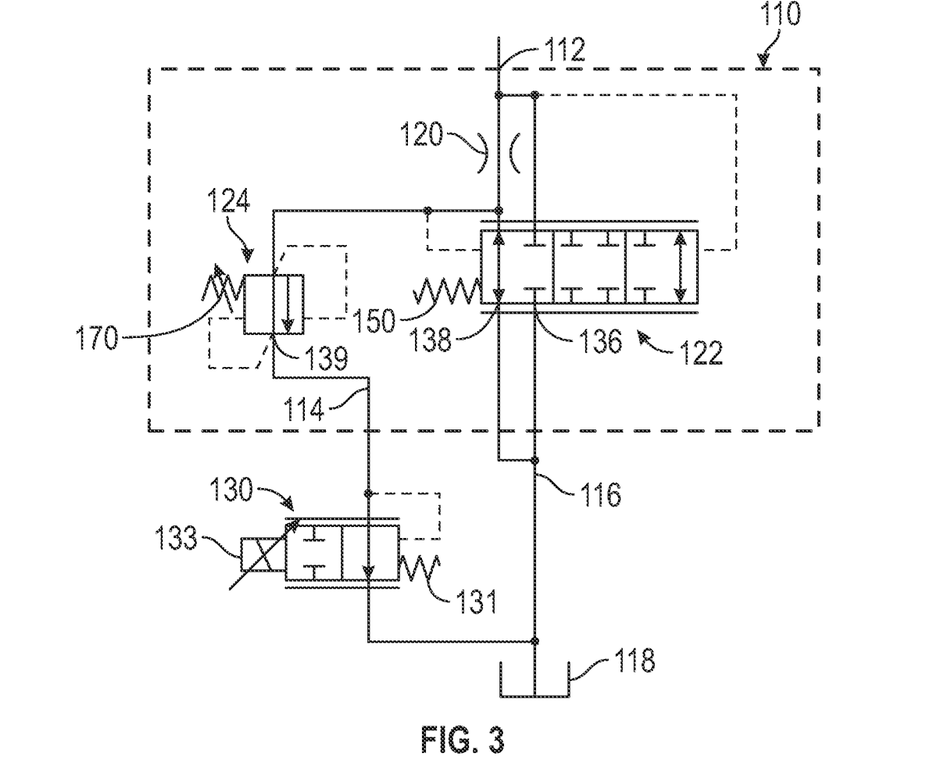
FIG. 3 illustrates a second non-limiting example of a load sense regulation system.

FIG. 3 illustrates another non-limiting example of a load sense regulation valve 110. In the illustrated non-limiting example, unless otherwise described below or illustrated in the figure, similar elements are labeled with similar reference numerals in the 100's. In the non-limiting example illustrated in FIG. 3, the first control port 138 provides fluid communication directly to tank, thereby bypassing the EPRV 130.

Figure 4:
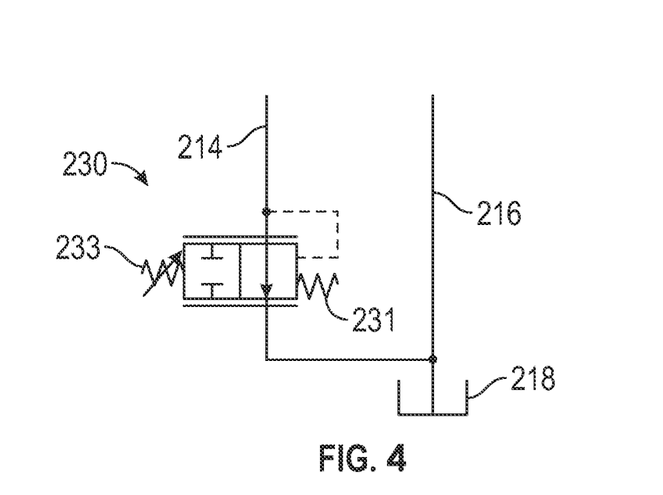
FIG. 4 illustrates a second non-limiting example of a downstream control valve according to one aspect of the present disclosure.

As previously described herein, the control valve downstream of the load sense regulation valve can be embodied in other forms to provide a similar function. FIG. 4 illustrates one such non-limiting example of a downstream control valve in the form of a mechanical pressure regulation valve 230. In the illustrated non-limiting example, unless otherwise described below or illustrated in the figure, similar elements are labeled with similar reference numerals in the 200's. In the illustrated non-limiting example, the mechanical pressure regulating valve 230 includes a variable spring 233 instead of a solenoid to set a predetermined upstream pressure within the pilot vent 214.

Figure 5:
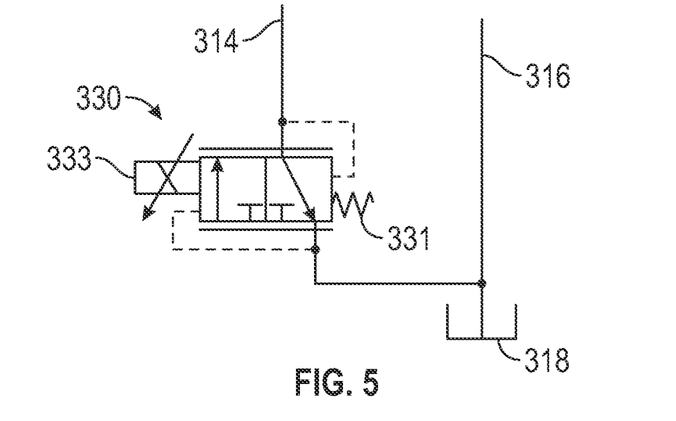
FIG. 5 illustrates a third non-limiting example of a downstream control valve according to one aspect of the present disclosure.
Figure 6:
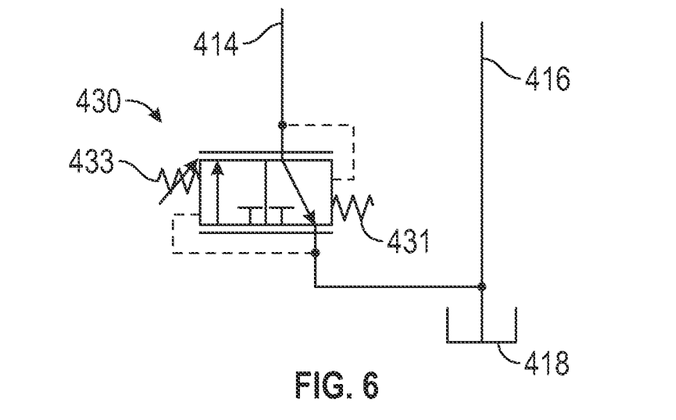
FIG. 6 illustrates a fourth non-limiting example of a downstream control valve according to one aspect of the present disclosure

FIG. 5 illustrates another non-limiting example of a downstream control valve in the form of an electrohydraulic pressure reducing and relieving valve 330. In the illustrated non-limiting example, unless otherwise described below or illustrated in the figure, similar elements are labeled with similar reference numerals in the 300's. In the illustrated non-limiting example, the electrohydraulic pressure reducing and relieving valve 330 includes a spring 331 configured to bias the electrohydraulic pressure reducing and relieving valve 330 toward a position providing fluid flow between the pilot vent 314 and the tank 318. The electrohydraulic pressure reducing and relieving valve 330 can also include a solenoid 333 configured to position the electrohydraulic pressure reducing and relieving valve 330 to selectively provide or restrict fluid flow into and out of the pilot vent 314. Although not illustrated in the figures, it is contemplated that a pressure source could be attached to the supply port (shown as being blocked) of the electrohydraulic pressure reducing and relieving valve 330. For example, the load sense inlet port 12 (FIG. 1) can be connected to the supply port, or a pump supply could be connected to the supply port. In such a non-limiting example, the pressure source can then be used to provide reduced pressure to the pilot vent 314 (e.g., prior to the pilot relief valve 24 opening).

FIG. 6 illustrates another non-limiting example of a downstream control valve in the form of a mechanical pressure reducing and relieving valve 430. In the illustrated non-limiting example, unless otherwise described below or illustrated in the figure, similar elements are labeled with similar reference numerals in the 400's. In the illustrated non-limiting example, the mechanical pressure reducing and relieving valve 430 includes a variable spring 433 instead of a solenoid to set a predetermined upstream pressure within the pilot vent 414.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A load sense pressure control system, the system comprising:
 a first control valve including:
  a load sense inlet port, a tank outlet port, and a pilot vent;
  a main poppet moveable between a first position and a second position;
  a poppet spring biasing the main poppet toward the first position;
  a relief poppet moveable between an open position and a closed position;
  a relief spring biasing the relief poppet toward the closed position;
  a control chamber arranged between the main poppet and the relief poppet,
  wherein the control chamber is in fluid communication with the pilot vent when the relief poppet is in the open position, and wherein the control chamber is in fluid communication with the pilot vent when the main poppet is in the first position; and
  a control orifice arranged between the load sense inlet port and the control chamber; and
 a second control valve downstream from and in fluid communication with the pilot vent, wherein the second control valve configured to adjust a pressure in the pilot vent from zero to a difference between a maximum load sense pressure relief setting and a minimum load sense pressure relief setting;
 wherein the relief poppet is configured to move toward the open position to vent pressure from the control chamber to the pilot vent when pressure in the control chamber is greater than a load sense pressure relief setting.

2. The system of claim 1, wherein the main poppet and the relief poppet are arranged within a common valve body.

3. The system of claim 1, wherein first control valve further comprises:
 a first control port configured to provide fluid communication from the control chamber to the pilot vent,
 wherein the main poppet defines a first metering edge configured to meter flow through the tank outlet port from the load sense inlet port to a tank and a second metering edge configured to meter flow through the first control port from the control chamber to the pilot vent.

4. The system of claim 3, wherein when the main poppet moves from the first position toward the second position:
 a first metering area between the first control port and the second metering edge decreases, and
 a second metering area between the tank outlet port and the first metering edge increases.

5. The system of claim 1, wherein the control orifice is provided on the main poppet.

6. The system of claim 1, wherein the second control valve is one of an electrohydraulic pressure reducing and relieving valve, a mechanical pressure reducing and relieving valve, a mechanical pressure regulating valve, or an electrohydraulic pressure regulating valve.

7. The system of claim 1, wherein the minimum load sense pressure relief setting is defined by a spring load from the relief spring acting on the relief poppet.

8. The system of claim 7, wherein the maximum load sense pressure relief setting is defined by the spring load acting on the relief poppet plus the pressure in the pilot vent acting on a spring side of the relief poppet.

9. The system of claim 1, wherein the first control valve is operable between a flow regulation mode and a pressure limiting mode, wherein when the relief poppet is in the closed position, the first control valve is in the flow regulation mode, wherein the main poppet is configured to move about the first position to maintain a balance between a load sense pressure acting on a first side of the main poppet, and a control chamber pressure and poppet spring acting on a second side of the main poppet.

10. The system of claim 9, wherein when a pressure in the control chamber exceeds the maximum load sense pressure relief setting, the relief poppet moves toward the open position and the first control valve is in the pressure limiting mode, wherein the main poppet is configured to move about the second position to vent load sense pressure to the tank outlet port.

11. A load sense relief system, the system comprising:
a load sense relief valve including:
   a relief poppet moveable between a closed position and an open position;
   a control chamber on a first side of the relief poppet;
   a relief chamber on a second side of the relief poppet opposite the first side; and
   a relief spring acting on the second side of the relief poppet, the relief spring defining a mechanical relief setting;
   a main poppet arranged between a load sense inlet port and the control chamber;
   a poppet spring arranged within the control chamber and configured to apply a spring load acting on a spring side of the main poppet;
   a control orifice configured to provide fluid communication between the load sense inlet port and the control chamber; and
a control valve downstream from and in fluid communication with the relief chamber, wherein the control valve is configured to apply a predetermined pressure acting on the second side of the relief poppet to increase a relief pressure setting of the load sense relief valve above the mechanical relief setting.

12. The system of claim 11, wherein when a pressure in the control chamber acting on the first side of the relief poppet exceeds a force of the relief spring acting on the second side of the relief poppet plus the predetermined pressure in the relief chamber acting on the second side of the relief poppet, the relief poppet moves from the closed position toward the open position to vent fluid from the control chamber to the control valve.

13. The system of claim 11, wherein the mechanical relief setting is adjustable by a relief adjustment mechanism configured to adjust a preload of the relief spring.

14. The system of claim 11, wherein the main poppet is configured to move in response to changes in pressure at the load sense inlet port to maintain a balance between a load sense pressure acting on a load sense side of the main poppet, and a control chamber pressure and poppet spring acting on the spring side of the main poppet.

15. The system of claim 11, wherein the control chamber and the relief chamber are arranged within a common valve body.

16. The system of claim 11, wherein the control valve is one of an electrohydraulic pressure reducing and relieving valve, a mechanical pressure reducing and relieving valve, a mechanical pressure regulating valve, or an electrohydraulic pressure regulating valve.

17. The system of claim 11, wherein the control valve is further configured to adjust a pressure in the relief chamber from zero to a difference between a maximum load sense pressure relief setting and a minimum load sense pressure relief setting.

18. The system of claim 17, wherein the control valve is an electrohydraulic pressure regulating valve moveable between an open position and a closed position, wherein when the electrohydraulic pressure regulating valve is in the open position, fluid communication is provided between the relief chamber and tank.

19. The system of claim 18, wherein the electrohydraulic pressure regulating valve is normally open.

20. The system of claim 18, wherein when electrohydraulic pressure regulating valve is commanded from the open position toward the closed position, the relief pressure of the load sense relief valve increases above the mechanical relief setting.

* * * * *